United States Patent Office 3,480,043
Patented Nov. 25, 1969

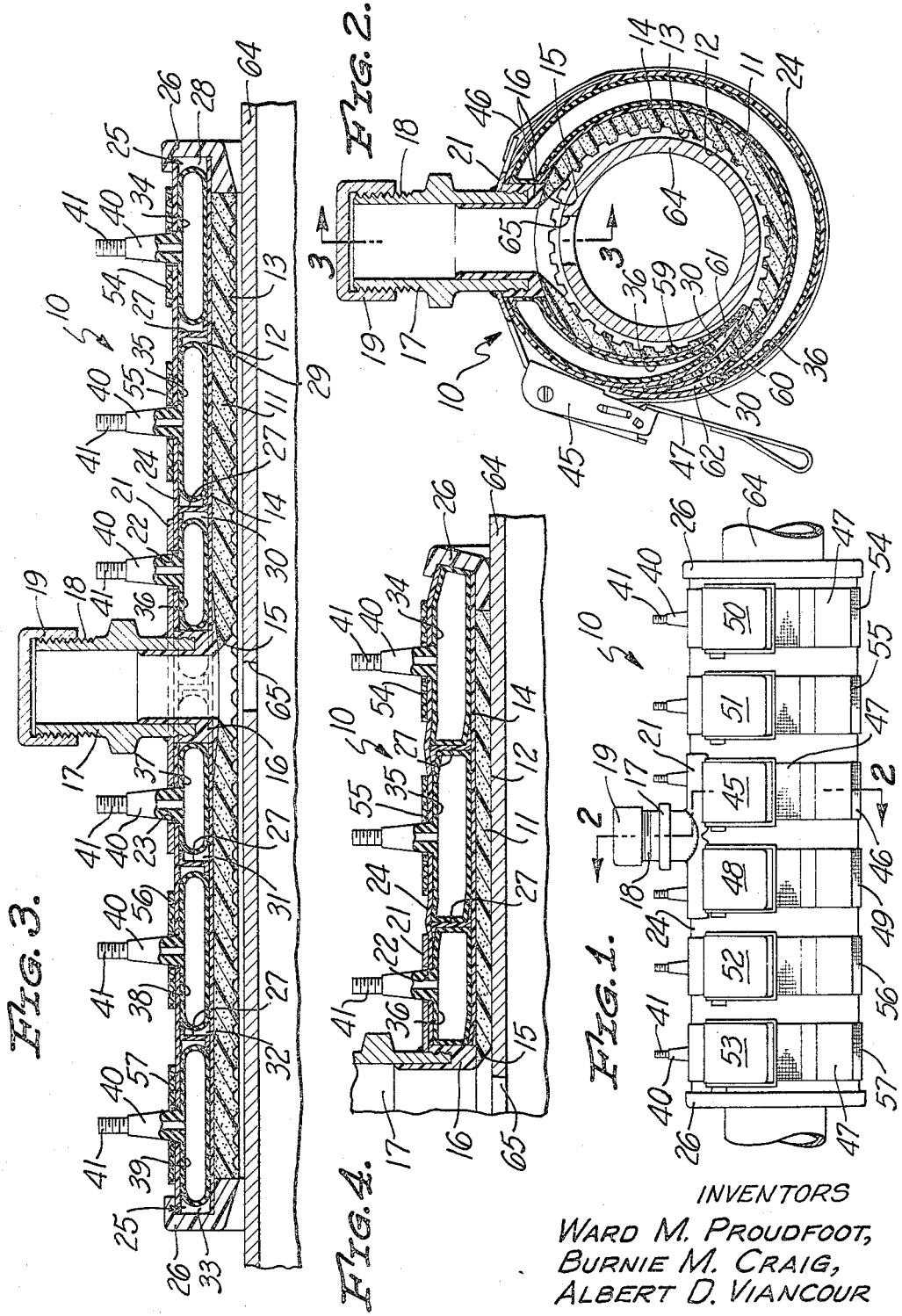

3,480,043
EMERGENCY LEAK CLAMP
Ward M. Proudfoot, Palos Verdes Estates, Burnie M. Craig, Pasadena, and Albert D. Viancour, Monterey Park, Calif., assignors, by mesne assignments, to Ward M. Proudfoot, Palos Verdes Estates, Calif.
Filed Jan. 12, 1967, Ser. No. 608,883
Int. Cl. F16l 55/16
U.S. Cl. 138—99                              2 Claims

ABSTRACT OF THE DISCLOSURE

A resilient, inflatable pipe clamp which can be wrapped around a pipe in place, over a rupture in the pipe and while fluid is discharging therefrom, and inflated to stop such discharge of fluid.

---

This invention relates to an emergency pipe clamp which can be quickly applied to a run of pipe or tubing carrying a fluid under pressure to seal a rupture therein and prevent the escape of fluid therefrom, without disrupting the normal flow of fluid through the pipe or tubing.

Public utility companies and others which convey large volumes of fluids, such as, for example, gas, oil, water, and other liquids, through subterranean pipe lines and tubings commonly find that the same are inadvertently ruptured and damaged by others having occasion to perform excavating or grading work adjacent thereto. When such a pipe line is ruptured in a metropolitan area, particularly when the fluid carried thereby is an inflammable gas, usually involves a disruption of nearby street traffic, the possible evacuation of nearby buildings, and often requires the participation of fire and police agencies until the leak through the rupture is controlled. Although such a ruptured pipe line can be taken out of service, by shutting appropriate main valves in the line, this interrupts the flow of fluid therethrough and disrupts service through the line, which is highly undesirable.

Accordingly, it is a primary object of this invention to provide an emergency clamping device that can be quickly and effectively applied to a ruptured pipe line carrying a fluid under pressure therein to seal the rupture so as to prevent the escape of fluid from the line, without discontinuing service through the line.

Other objects and advantages of the invention will appear from the following specification and the drawing, which are for the purposes of illustration only, and in which:

FIG. 1 is a longitudinal elevational view of the emergency clamp of this invention;

FIG. 2 is a cross-sectional view taken on the line 2—2 of FIG. 1;

FIG. 3 is an enlarged longitudinal sectional view taken on the line 3—3 of FIG. 2; and FIG. 4 is a fragmentary view of a portion of the device shown in FIG. 3, illustrating the parts thereof in full sealing operation.

Referring to the drawing, an emergency sealing clamp 10 includes an inner sheet 11 formed of a resilient material, such as neoprene, the inner face 12 of which is provided with waffle-like indentations 13 over its entire surface. Superimposed on, and preferably bonded to, the inner sheet 11 is a central sheet 14 formed of an elastomeric material, such as neoprene. The inner sheet 11 is provided with a central opening 15 with which is aligned an outwardly extending nipple 16, also formed of an elastomeric material, such as neoprene, and bonded to the inner sheet 11, to which is bonded an outwardly extending metal nipple 17 provided with threads 18 adapted to receive a threaded dust cap 19. Welded to the metal nipple 17 is an arcuate metal reinforcing plate 21, provided with openings 22 and 23 therein.

Within the arcuate plate 21 is an outer sheet 24 formed of a resilient but stretch-resistant material such as nylon reinforced neoprene, to form a central space 25 between the central sheet 14 and the outer sheet 24, such space being closed at each end by an end cap 26 formed of an elastomeric material which is bonded to the central and outer sheets. Within the space 25 are dividers 27, also formed of elastomeric material, such as neoprene, and bonded to the central and outer sheets 14 and 24, respectively. The dividers 27 divide the space 25 into a plurality of cells 28, 29, 30, 31, 32, and 33, in which are provided inflatable bladders 34, 35, 36, 37, 38, and 39, respectively, each of which is formed of a resilient, expansible material, such as rubber or neoprene, each of which is provided with an outwardly extending nipple 40 formed integrally with its associated bladder and extending outwardly through a suitable hole in the outer sheet 24. Each of the nipples 40 has therein a conventional automobile tire valve stem 41 containing a conventional valve element (not shown) adapted to admit or release fluid pressure from the interior of the associated bladder.

Secured to one side of the arcuate plate 21, as best shown in FIG. 2, is a buckle means 45, which may be of the same type conventionally used as a safety seat belt buckle, as is well known in the automobile industry. Secured to the other side of the plate 21 is a resilient tensioning belt 46, the free end 47 of which passes through and is adapted to be retained by the buckle means 45 in conventional fashion, the belt preferably being formed of high tension material such as the nylon webbing conventionally used in automobile safety seat belts. Similarly attached to the arcuate plate 21 is a buckle means 48 and tensioning belt 49, identical with the buckle means 45 and belt 46, respectively. As will be noted, the belts 46 and 49 overlie the cells 30 and 31, respectively. Generally similar buckles 50, 51, 52, and 53 having similar tensioning belts 54, 55, 56, and 57 overlying the cells 28, 29, 32, and 33, respectively, the only difference being that instead of the latter belts being connected to any plates such as the arcuate plate 21, they are connected at one end directly to their associated buckles and the free ends thereof are passed through the associated buckle as is the free end 47 of the belt 46.

As will be noted from FIG. 2, the sides 59 and 60 of the inner sheet 11 taper towards their edges, the air cell 30 similarly tapers towards the edges 61 and 62, as do the other similar air cells, and the bladder 34, and the other similar bladders, similarly taper towards their edges, all as illustrated in FIG. 2, and this is an important feature of the invention.

The drawing shows the emergency clamp 10 of the invention installed around a conventional pipe line 64, normally carrying a fluid, such as gas, oil, or other liquid, under pressure therein, and having a hole or rupture 65 therein. As will be understood, prior to installation of the sealing clamp 10 on a pipe such as the pipe line 64, the free ends 47 of the belts 46, 49, 54, 55, 56, and 57, are disassociated from their respective buckles and the edges of the clamp may be spread apart a distance at least as great as the internal diameter of the clamp when it is installed as shown in FIG. 2. In this condition, the clamp may readily be slipped over a pipe or pipe line, such as the pipe line 64, its edges overlapped as illustrated in FIG. 2, the belts 46, 49, 54, 55, 56, 57 being inserted through their respective buckle means and drawn tight so as to draw the clamp 10 into tight engagement with the exterior of the pipe line 64. Prior to installation, the cap 19 is removed from the metal nipple 17, which permits gas or other fluid escaping through the rupture 65 of the pipe line 64 to vent itself through the nipple 17 until such time as the clamp 10 is fully installed on the pipe line. After the clamp 10 is installed on the pipe line as generally illustrated in FIG. 2, air or other gas under pressure is supplied to the inflatable bladders 34, 35, 36, 37, 38, and 39 to expand them to position substantially as illustrated in FIG. 4, filling their respective cells 28 to 33, inclusive, and forcing the inner face 12 of the inner sheet 11 into full sealing engagement with the exterior of the pipe line 64 completely around the pipe line and along it in both directions from the rupture 65, to form a fluid-tight seal therearound. Preferably, prior to installation of the clamp 10 on a pipe line the dust cap 19 is removed from the nipple 17 and is replaced by a suitable threaded valve (not shown) for controlling and finally stopping the discharge of gas through the nipple from the pipe line. Thus, an important aspect of the invention is the provision of such means for gradually shutting off the leaking gas. Installation of the clamp, as so described, requires only a few minutes and it may be left in this sealing condition indefinitely and until such time as it may be convenient to disrupt service through the pipe line 64 to permit removal of the clamp and repair of the rupture.

Although we have described a preferred embodiment of the invention, it will be understood by those skilled in the art that various departures may be made therefrom without departing from the spirit of the invention, and we do not desire to be limited to the preferred embodiment shown and described but desire to be afforded the full scope of the following claims.

We claim:

1. In an emergency leak clamp for a pipe, the combination of:
   a resilient inflatable tube tapered in cross-section toward its ends and adapted to be wrapped around a pipe so as to cover an area of leakage therethrough and so that the ends of the tube may be overlapped without substantially increasing the overall thickness of the clamp in the area of the overlap;
   valve means connected to the exterior of said tube and adapted to admit an inflating gas into the tube to inflate the same;
   confining means covering the exterior of said tube when wrapped around a pipe, and adapted to resist external expansion of said tube when inflated with gas; and
   means for securing said confining means around a pipe, with said tube confined therein, so that upon the admission of gas under pressure into the tube it will be internally contracted into sealing engagement with the pipe to stop outward leakage from the pipe through said area.

2. In an emergency leak clamp for a pipe, the combination of:
   a plurality of inflatable, resilient tubes, disposed side by side, each of said tubes being tapered in cross-section towards its ends, so that ends of the tubes may be overlapped without substantially increasing the overall thickness of the clamp in the area of the overlap;
   a nipple connected to and extending externally from each of said tubes and having valve means therein adapted to admit an inflating gas to the interior of its associated tube;
   a flexible external cover overlaying and covering all of of said tubes;
   a continuous flexible internal lining on the inner sides of said tubes, adapted to engage and grip a pipe;
   a plurality of parallel and spaced flexible straps on the outside of said cover; and
   detachable buckle means on the ends of each of said straps and adapted to draw and wrap around the ends of said straps and the underlying structure together and to clamp it securely to a pipe about which it has been wrapped with the ends of the structure overlapping.

References Cited

UNITED STATES PATENTS

| | | | |
|---|---|---|---|
| 141,536 | 8/1873 | Bellemere | 138—99 |
| 2,002,577 | 5/1935 | Ice | 138—99 |
| 3,023,995 | 3/1962 | Hopkins | 285—97 X |
| 3,033,594 | 5/1962 | Cushman | 285—97 |
| 3,253,854 | 5/1966 | Hollander | 285—97 X |

FOREIGN PATENTS 1,461,769  11/1966  France.

HERBERT F. ROSS, Primary Examiner

U.S. Cl. X.R.

285—97